Patented Aug. 4, 1936

2,049,517

UNITED STATES PATENT OFFICE 2,049,517

METHOD OF AND MATERIAL FOR INHIBITING OR RETARDING ACID CORROSION OF FERROUS METALS

Albert J. Saukaitis, Philadelphia, Pa., assignor to American Chemical Paint Company, Ambler, Pa., a corporation of Delaware No Drawing. Application June 6, 1934, Serial No. 729,231

14 Claims. (Cl. 148—8.1)

This invention relates to the art of inhibiting or retarding the corrosion of ferrous metals by acids and it is especially useful in retarding the action of the halogenous acids such as hydrochloric, hydrobromic or hydriodic acids or their mixtures with each other or with other acids, and, as will further appear, it involves both method and material.

While of very general application, it is desired to point out that the invention is particularly useful in protecting tanks, shipping containers, etc., against attack by contained acid solutions; in the pickling of iron or steel; in the removal of water scale from boilers, cooling systems, washing machinery, etc., i. e., to the art of removing extraneous matter from the presence of ferrous metals by means of acid solutions; in the rejuvenation of wells in petroleum mining, where the well casing is to be protected; and in many other instances which will occur to those skilled in the art.

It is well known, especially in the art of pickling, to add to the acid solutions used, certain substances which are commonly known as inhibitors. These substances are usually of an organic nature and act to retard the attack of the acid on the steel or the iron while the scale is being removed. A great many substances have been proposed for this purpose—so many in fact that no enumeration of them will be attempted—but in the following disclosure such terms as "inhibitor", "inhibiting power", etc. shall be understood as referring to materials which tend to retard the solution of ferrous metals in acids.

The principal objects of the invention are to provide a new and very effective inhibitor; to increase enormously the effectiveness of organic inhibitors; to make useful as inhibitors a number of substances which would otherwise be ineffective or commercially unavailable; and in general to provide an improved and less expensive method of inhibiting or retarding acid corrosion of ferrous metals.

I have discovered that if there is added to the acid solution, whose attack on metal is to be inhibited or retarded, a small amount of a compound of copper alone or in combination with an organic addition agent, the action of the acid on the metal will be markedly restrained. The copper may be added in the form of any convenient compound which can be dissolved in the solution, as, for instance, cupric oxide, cuprous oxide, cupric carbonate, cupric chloride, cuprous chloride, cupric sulphate, cupric acetate, cupric nitrate, cupric benzoate, etc. My experiments in connection with the development of the invention have shown that the nature of the compound in which the copper is combined is of little consequence so long as the copper is brought into solution in sufficient amount. As stated, I have discovered that copper alone will act to greatly inhibit or retard the effect of the acid on the metal, but in combination with organic inhibitors the inhibiting effects are astonishingly increased. Indeed, the combination of copper and an organic inhibitor results in an inhibiting effect which is more powerful than can be ascribed to the summation of the single effects of the copper and the organic inhibitor.

Among those substances to which the presence of copper imparts a greatly increased inhibiting power in acid solutions I should like to mention the following:— aldol; thioureas; dithiocarbamates; basic substances extracted from animal distillates; coal tar fractions; aldehydeamine reaction products, among which may be mentioned those produced from formaldehyde and orthotoluidine, benzaldehyde and aniline, acetaldehyde and aniline, aldol and alphanaphthylamine, formaldehyde and amylamine; aldehyde-ammonia reaction products such as hexamethylene tetramine and acetaldehyde ammonia; and many others. These substances are in themselves moderately strong inhibitors but when used in combination with copper, in accordance with the present invention, there is imparted to the solution a greatly increased inhibiting power.

Among other substances, not in themselves sufficiently powerful as inhibitors to be commercially useful, to which the presence of a small amount of copper imparts great inhibiting strength, are evaporated sulphite pulp waste liquor, amylamine, quinaldine, diamylamine, triamylamine, orthotoluidine, formaldehyde, paraformaldehyde, benzaldehyde, butyl aldehyde, glue, etc.

It will be seen, therefore, that copper is useful both as an inhibitor by itself as well as a promoter of inhibiting power in other substances. The term "promoter" is taken from the terminology of catalytic processes in which art it refers to a substance which, when present with the catalytic agent, increases its effectiveness as a catalyst; and in the present disclosure I have used the term "promoter" in a similar manner to indicate a substance which, when present with an inhibitor, increases the effectiveness of the inhibitor.

It is difficult to classify the organic compounds which are thus "promoted" in inhibiting strength by the presence of copper, but I have found by experiment that there are so many different varieties of substances which respond in accordance with the present invention that I think myself justified in assuming that any organic material which has any tendency to act as an inhibitor of acid attack on ferrous metals will coact with copper to produce a more powerful inhibiting effect than can be ascribed to the summation of the single effects of the copper and the other inhibiting substance. The reason for this mutual strengthening effect is not known to me but its reality has been proved by many experiments.

The inhibiting effect as well as the promoting action of the copper on the inhibiting power of other substances varies somewhat with the nature of the acid used. Copper is more effective in these properties in solutions of the halogenous acids such as hydrochloric or hydrobromic acids or in mixtures of acids containing substantial quantities of one or more of these acids. It is less effective in sulphuric, phosphoric, and hydrofluoric acids but regains its effectiveness if solutions of these acids also contain substantial quantities of one of the first named acids. It is ineffective in solutions of pure nitric acid but is quite strong in its effect in mixtures of hydrochloric and nitric acids; for example, in a solution 5 normal with respect to hydrochloric acid and ½ normal with respect to nitric acid.

I include below in tabulated form certain examples of the action of copper salts alone and in combination with other substances. The results indicated were obtained under the following conditions: 250 ml. of a hydrochloric acid solution 5 normal in strength constituted the acid bath which was maintained at 150° F. A specimen of ordinary hot rolled mild steel, of about 30 square inches surface area was used, in the as-rolled condition, in each experiment. The rate of attack on the steel was followed by measuring the rate of hydrogen evolution which is expressed as its equivalent volume at 760 mm. pressure, 20° C., saturated with water vapor. Although the rates were followed for much longer periods, the hydrogen evolution was so nearly linear with respect to time that the results are expressed fairly below, as the average rate of hydrogen evolution in ml. per minute, over a total hydrogen evolution of 2 liters or a time of 6 hours, whichever occurred first.

*Table No. 1*

| Inhibitor used | Quantity inhibitor gm. per liter of solution | Rate hydrogen evolution ml. per min. |
| --- | --- | --- |
| None | None | 280 |
| Copper (added as carbonate) | 0.250 gm | 11.4 |
| Copper (added as chloride) | 0.125 gm | 11.4 |
| Copper (added as acetate) | 0.0625 gm | 11.4 |
| Aldol | 2.50 gm | 17.7 |
| Aldol<br>Copper (added as carbonate) | 2.50 gm<br>0.125 gm | 1.92 |
| Solution coal tar bases, commercial | 2.50 ml | 16.7 |
| Solution coal tar bases<br>Copper (as nitrate) | 2.50 ml<br>0.125 gm | 5.97 |
| Solution coal tar bases, commercial | 5.00 ml | 16.7 |
| Solution animal distillate | 2.50 ml | 39.2 |
| Solution animal distillate<br>Copper (as carbonate) | 2.50 ml<br>0.125 gm | 5.97 |
| Formalin | 2.50 ml | 91.70 |
| Formalin<br>Copper (as benzoate) | 2.50 ml<br>0.125 gm | 2.38 |
| Benzaldehyde | 2.50 ml | 280 |
| Benzaldehyde<br>Copper (as oxide) | 2.50 ml<br>0.125 gm | 4.59 |
| Triamylamine | 2.50 ml | 280 |
| Triamylamine<br>Copper (as carbonate) | 2.50 ml<br>0.125 gm | 7.74 |
| Thiourea | 2.50 ml | 72.2 |
| Thiourea<br>Copper (as carbonate) | 2.50 ml<br>0.125 gm | 6.67 |
| O-toluidine | 2.50 ml | 280.0 |
| O-toluidine<br>Copper (as sulphate) | 2.50 ml<br>0.125 gm | 8.30 |

Examples of the effects of copper in certain other acids are given in Table No. 2 below. The volume of each solution, the temperature and the type of specimen were the same as in the experiments of Table No. 1. Where copper is listed as present it was added to the bath in the form of copper carbonate sufficient to give a copper content of 0.25 gms. per liter of solution.

*Table No. 2*

| Acid used | Concentrations of acids | Copper | Rate of hydrogen evolution ml. per min. |
| --- | --- | --- | --- |
| Hydrobromic | 5 N | Absent | 194 |
| Hydrobromic | 5 N | Present | 11.1 |
| Hydriodic | 5 N | Absent | 63.6 |
| Hydriodic | 5 N | Present | 15.0 |
| Hydrochloric<br>Phosphoric | 2.5 N<br>2.5 N | Absent | 290 |
| Hydrochloric<br>Phosphoric | 2.5 N<br>2.5 N | Present | 13.0 |
| Hydrochloric<br>Sulphuric | 2.5 N<br>1.5 N | Absent | 280 |
| Hydrochloric<br>Sulphuric | 2.5 N<br>1.5 N | Present | 13.3 |
| Hydrochloric<br>Nitric | 2.5 N<br>0.5 N | Absent | 146 |
| Hydrochloric<br>Nitric | 2.5 N<br>0.5 N | Present | 12.5 |

I wish to point out that the inhibiting effect of copper and its promoting effect on the strength of organic addition agents are also present in solutions of different concentrations of acid and inhibitor and at both higher and lower temperatures than those given in the above tables, so that the results given in the tables are to be taken merely as illustrative of these actions and the conditions set forth are not to be interpreted as the only ones under which the process and material will operate.

I should also like to point out that if the amounts of copper present are not too great, no visible deposit of copper will be precipitated on the metal. However, if an excess of copper is employed such a deposit will be formed but there will always remain in the solution a sufficient amount to exhibit the maximum inhibiting effect. Furthermore, the exact amount of copper for producing the maximum effectiveness in inhibiting and inhibitor-promoting power will vary somewhat with the kind and strength of acid employed. For example, in hydrochloric acid baths I have found that this maximum effectiveness is reached at a concentration of copper between 0.002% and 0.010% by weight, but amounts 100 or more times as large do no harm, provided that a copper deposit on the metal is not objectionable. Incidentally it should be noted that copper concentrations up to 0.025% to 0.050% by weight usually produce no visible copper deposit and I prefer to use an amount of copper which is just insufficient to produce a visible deposit on the metal.

As examples of promoted inhibitors made according to the present invention, I should like to give the following formulas:

*Formula No. 1*

| | |
| --- | --- |
| Formaldehyde - ortho - toluidine reaction product | 2.25 pounds |
| Cupric chloride, anhydrous | 0.50 pound |
| Commercial muriatic acid, 20° Bé | 0.155 gallon |
| Alcohol, denatured | 0.350 gallon |
| Water, to make | 1.00 gallon |

The foregoing makes a clear solution suitable for use in the pickling of steel, etc. The formaldehyde-ortho-toluidine reaction product may be separately prepared, isolated and dissolved with the other ingredients to make the mixture as given or the formaldehyde may be added as the commercial 38% solution known as formalin to the toluidine, the reaction completed by heat and the addition of some of the acid, or by other appropriate means, and the formula may then be completed by incorporating the other ingredients. Further variations are possible in the manufacturing procedure as will be evident to the chemist and I do not wish to be limited to any specific method of manufacture or definite proportion of ingredients. The denatured alcohol in this formula is used as a diluent and homogenizer.

A second formula is as follows:

*Formula No. 2*

| | Pound |
|---|---|
| Formaniline | 0.2000 |
| Copper carbonate | 0.0500 |
| Common salt | 0.7500 |
| Total | 1.0000 |

The ingredients of this formula are mixed thoroughly. The material is easily soluble in acid solution, is preferably stable and may be conveniently handled. It is suitable for any of the purposes herein specified. The salt is used as a bulking agent or extender to facilitate the weighing of the small quantities of inhibitor generally used.

In connection with Formulas No. 1 and No. 2 given just above it should be noted that the use of appropriate solvents, diluents, bulking agents, etc. is often desirable as a convenience in handling, weighing, etc., but my invention is in no way to be limited to any such materials.

As a specific example of the manner in which my invention may be carried out in connection with the pickling of steel, I may prepare a pickling bath of the following composition:

| | Gallons |
|---|---|
| 20° Bé. hydrochloric acid | 500 |
| Water | 500 |

To this solution I may add 3.91 lbs. of copper carbonate or other copper salt to yield approximately 1.95 lbs. of copper in solution. I prefer to heat the bath to 130° to 160° F. The work to be pickled may be immersed in the bath until the scale is removed, which may take from 10 to 45 minutes, depending upon the kind of steel. The work is then separated from the solution, rinsed with water, treated with a solution of dilute alkali or lime, immersed again and dried.

By this procedure the steel is left clean and practically unetched. Gassing is slight during pickling, there is little acid consumption or iron accumulation and the steel is left free from acid-brittleness. More acid may be added to the bath as required, as well as more inhibitor, until the bath contains too much iron to be further useful.

As a further example of the manner in which my invention may be put to use I should like to cite the following cleansing operation in connection with the removal of lime scale from automobile cooling systems. A solution is prepared in accordance with the following formula:

| 20° Bé. hydrochloric acid | 0.500 gallon |
|---|---|
| Water | 0.500 gallon |
| Copper carbonate | 0.0021 pound |
| Methylene o-toluidine | 0.0083 pound |

The water is first drained from the automobile cooling system. Sufficient of the solution to fill the cooling system is introduced, and the engine is allowed to run until the scale is removed. This may require 15 minutes to 2 hours, depending on conditions. The solution is then drained off, the cooling system is washed successively with water, with a dilute acid neutralizer such as trisodium phosphate, and again with water. By this process the cooling system is completely freed from scale and rust and is left in perfect condition for the attainment of maximum cooling efficiency. No appreciable attack on the metal is sustained and the process may be repeated whenever required.

In conclusion I wish it to be distinctly understood that I do not limit myself to the precise proportions or combinations of ingredients given in the various examples above set forth or to the exact details of procedure described because, as will be perfectly apparent to those skilled in the art, many variations may be adopted without departing from the spirit or scope of the invention as defined in the appended claims.

In the claims which follow the term halogenous acids is to be interpreted as including hydrochloric, hydrobromic and hydriodic acids.

I claim:—

1. The method of removing extraneous matter from the presence of ferrous metal which includes treatment thereof with an acid solution containing a halogenous acid, dissolved copper and an organic inhibitor.

2. The method of removing extraneous matter from the presence of ferrous metal which includes treatment thereof with an acid solution containing a halogenous acid, dissolved copper, and an organic compound of a class which consists of evaporated sulphite pulp waste liquor, amylamine, quinaldine, diamylamine, triamylamine, orthotoluidine, fractions of coal tar, fractions of a distillate from animal bodies, glue, thioamides, thioureas, dithiocarbamates, amines, aldehydes, polymerized aldehydes, aldol, and reaction products of aldehydes and amines or ammonia.

3. The method of claim 2 wherein the quantity of copper in the solution is insufficient to produce a visible deposit of copper on the metal.

4. A pickling or cleaning solution including a halogenous acid, dissolved copper and an organic inhibitor.

5. A pickling or cleaning solution including a halogenous acid, dissolved copper and an organic compound of a class which consists of evaporated sulphite pulp waste liquor, amylamine, quinaldine, diamylamine, triamylamine, orthotoluidine, fractions of coal tar, fractions of a distillate from animal bodies, glue, thioamides, thioureas, dithiocarbamates, amines, aldehydes, polymerized aldehydes, aldol, and reaction products of aldehydes and amines or ammonia.

6. An inhibitor of the corrosion of ferrous metal by hydrochloric, hydrobromic, or hydriodic acids or their mixtures with each other or with other acids including an organic inhibitor and a promoter comprising copper.

7. An inhibitor of the corrosion of ferrous metal by halogenous acids or their mixtures with each other or with other acids, said inhibitor including a reaction product of an aldehyde and an amine, and a promoter comprising copper.

8. An inhibitor of the corrosion of ferrous metal by halogenous acids or their mixtures with each other or with other acids, said inhibitor including hexamethylene tetramine, and a promoter comprising copper.

9. A hot pickling bath including the following in substantially the proportions indicated:

| | |
|---|---|
| 20° Bé. hydrochloric acid | 500 gallons |
| Water | 500 gallons |
| Copper in solution | 1.95 pounds |

10. The method of claim 1 wherein the solution is heated to a temperature in the neighborhood of 150° F.

11. The method of claim 2 wherein the solution is heated to a temperature in the neighborhood of 150° F.

12. The method of removing extraneous matter from the presence of ferrous metal which includes treatment thereof with a hot pickling bath containing a halogenous acid and dissolved copper, the quantity of copper in the bath being such as not to exceed .05% by weight and insufficient to produce a visible deposit of copper on the metal.

13. The method of claim 1 wherein the quantity of copper in the solution is insufficient to produce a visible deposit of copper on the metal.

14. A hot pickling bath for cleaning ferrous metal comprising a halogenous acid and dissolved copper, the quantity of copper in the bath being such as not to exceed .05% by weight and insufficient to produce a visible deposit on the treated metal.

ALBERT J. SAUKAITIS.

CERTIFICATE OF CORRECTION.

Patent No. 2,049,517.　　　　　　　　　　　　　　　　August 4, 1936.

ALBERT J. SAUKAITIS.

It is hereby certified that error appears in the printed specification of the above numbered patent requiring correction as follows: Page 2, first column, line 68, in the table, last column, for "8.30" read 8.33; page 3, first column, line 21, for "preferably" read perfectly; and that the said Letters Patent should be read with these corrections therein that the same may conform to the record of the case in the Patent Office.

Signed and sealed this 29th day of September, A. D. 1936.

Henry Van Arsdale

Acting Commissioner of Patents.

(Seal)